(12) United States Patent
Chen

(10) Patent No.: US 7,965,338 B2
(45) Date of Patent: Jun. 21, 2011

(54) MEDIA PLAYER AUDIO VIDEO SYNCHRONIZATION

(75) Inventor: Bi Chen, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1445 days.

(21) Appl. No.: 11/278,930

(22) Filed: Apr. 6, 2006

(65) Prior Publication Data

US 2007/0237494 A1 Oct. 11, 2007

(51) Int. Cl.
*H04N 17/02* (2006.01)
*H04N 9/475* (2006.01)

(52) U.S. Cl. ........................... 348/515; 348/194

(58) Field of Classification Search .................. 348/512, 348/515, 194, 181, 192, 184; 702/69, 71, 702/72, 81; 714/47, 775, 776, 819, 820, 714/824

See application file for complete search history.

(56) References Cited

U.S. PATENT DOCUMENTS

| | | | |
|---|---|---|---|
| 5,572,261 A * | 11/1996 | Cooper | 348/512 |
| 6,429,902 B1 * | 8/2002 | Har-Chen et al. | 348/518 |
| 7,552,352 B2 * | 6/2009 | Mani et al. | 713/400 |
| 7,636,126 B2 * | 12/2009 | Mallinson | 348/515 |
| 2005/0253965 A1 * | 11/2005 | Cooper | 348/515 |
| 2006/0012710 A1 * | 1/2006 | Sasaki | 348/515 |
| 2006/0209210 A1 * | 9/2006 | Swan et al. | 348/515 |
| 2007/0126929 A1 * | 6/2007 | Han et al. | 348/515 |

* cited by examiner

*Primary Examiner* — Victor Kostak
(74) *Attorney, Agent, or Firm* — Lee & Hayes, PLLC

(57) ABSTRACT

Techniques for evaluating media player performance are described. A particular implementation supplies media to a media player where the media includes a video component which has a waveform that alternates between a first video state and a second video state, and an audio component which has a waveform that alternates between a first audio state and a second audio state. In the supplied media the audio and video components are temporally synchronized in transition between respective first and second states. The process further analyzes corresponding output from the media player to determine an extent to which the audio and video components are temporally unsynchronized.

21 Claims, 7 Drawing Sheets

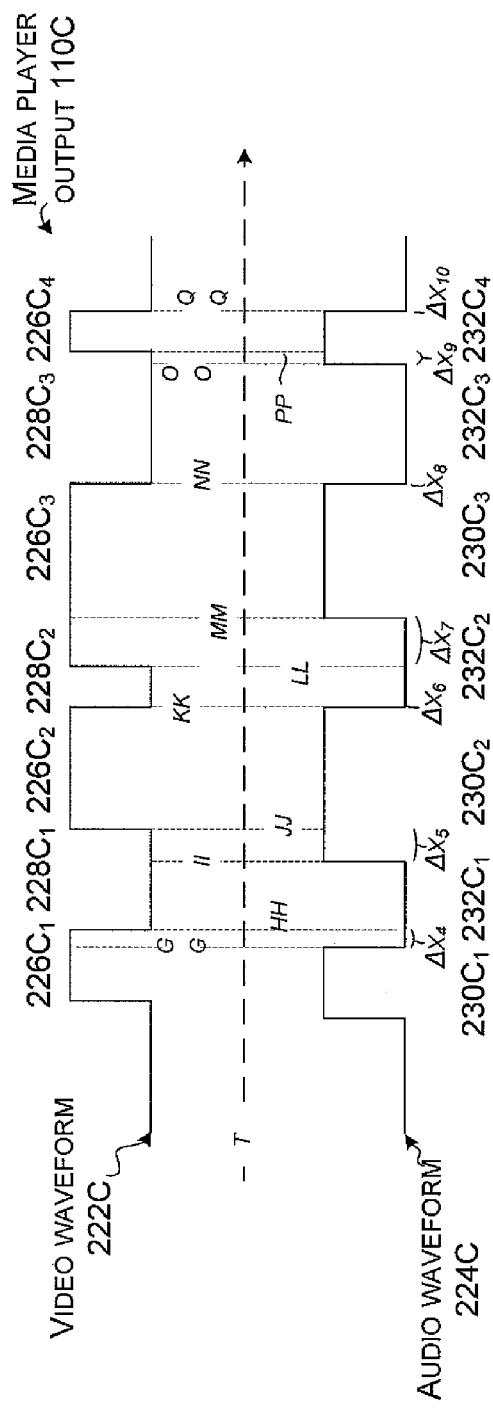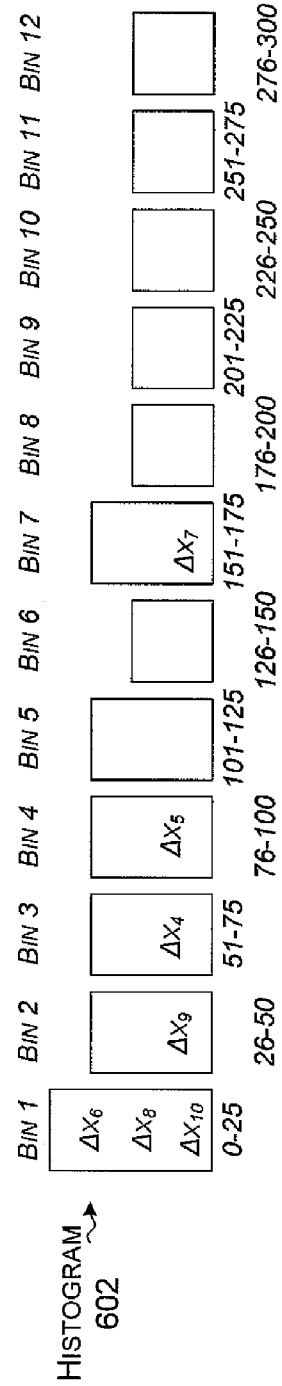
FIG. 5
FIG. 6

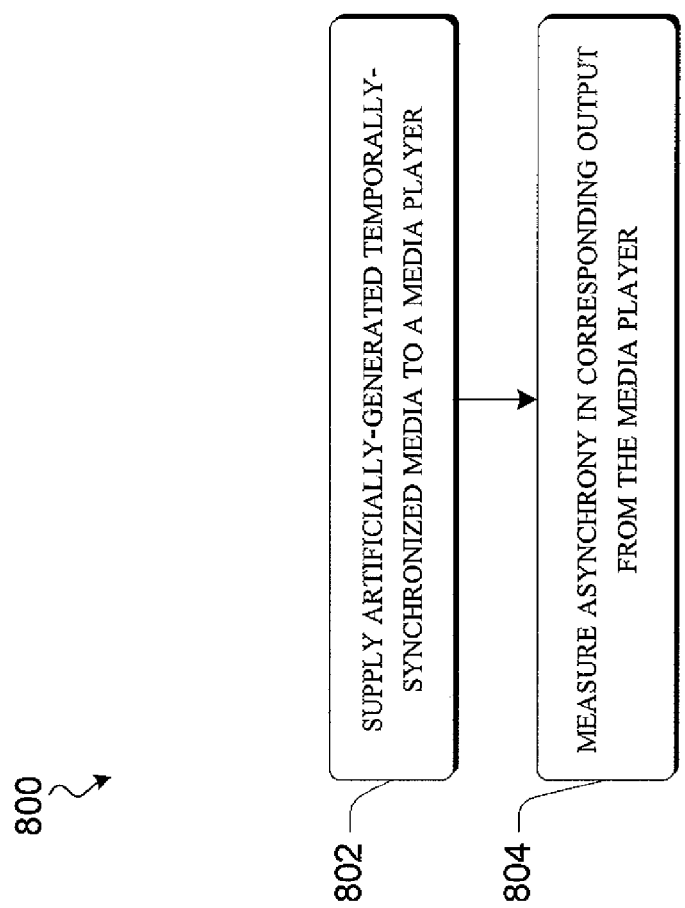

MEDIA PLAYER AUDIO VIDEO SYNCHRONIZATION

BACKGROUND

A large consumer demand exists for viewing and listening to media content. Such media content is readily available from a multitude of sources and can be played for the consumer on a multitude of media playing mechanisms. Consumers desire a quality experience when they watch such media. One factor which can diminish the user experience is a lack of temporal synchronization between corresponding audio and video content of the media. At some point the lack of temporal synchronization or asynchrony produces what is termed in the art as "lip synch". Present technologies rely on human testers to determine if a particular media playing mechanism produces lip synch.

SUMMARY

Techniques for evaluating media player performance are described. Some implementations are useful for evaluating media player performance relating to audio video synchronization. A particular implementation supplies media to a media player where the media includes a video component which has a waveform that alternates between a first video state and a second video state, and an audio component which has a waveform that alternates between a first audio state and a second audio state. In the supplied media the audio and video components are temporally synchronized in transition between respective first and second states. The process further analyzes corresponding output from the media player to determine an extent to which the audio and video components are temporally unsynchronized.

BRIEF DESCRIPTION OF THE DRAWINGS

FIG. 5 illustrates an example of media player output which may be utilized for media player evaluation in accordance with one embodiment.

FIG. 6 illustrates a histogram for analyzing media player performance in accordance with one embodiment.

FIG. 8 illustrates an exemplary process diagram relating to media player performance in accordance with one implementation.

DETAILED DESCRIPTION

Overview

The following description relates to detecting audio/video asynchrony caused by a media player. Information derived from the detecting can be utilized in various ways to ultimately improve a user experience. For instance, two competing developmental media players can be tested against one another so that the media player which introduces less asynchrony can go into actual production for the consumer market. In another scenario, various algorithms configured for a particular media player can be compared in a quantitative manner. In still another instance, a media player algorithm can be evaluated to determine if it requires further tweaking before product release.

In one implementation a media player test sample is generated for testing media players and as such may be termed "artificially generated" in that the media player test sample is generated for testing rather than for conveying a movie or other content to a viewer. The media player test sample includes a video component and an audio component. Each of the video component and the audio component comprises a waveform. The video waveform alternates between a first video state and a second video state. Similarly, the audio waveform alternates between a first audio state and a second audio state. The video and audio waveforms are temporally synchronized to transition from one state to another at approximately the same time.

The media player test sample can be supplied to a media player under test. The corresponding media output of the media player can be analyzed to determine whether the media player is causing temporal asynchrony between the audio and video components, and if so how much.

The implementations below are described in the context of a computing environment which can provide a media player functionality. Various configurations can be implemented by computer-executable instructions or code means, such as program modules, that are executed by a computer, such as a personal computer or PC. Generally, program modules include routines, programs, objects, components, data structures and the like that perform particular tasks or implement particular abstract data types.

Figure 7:
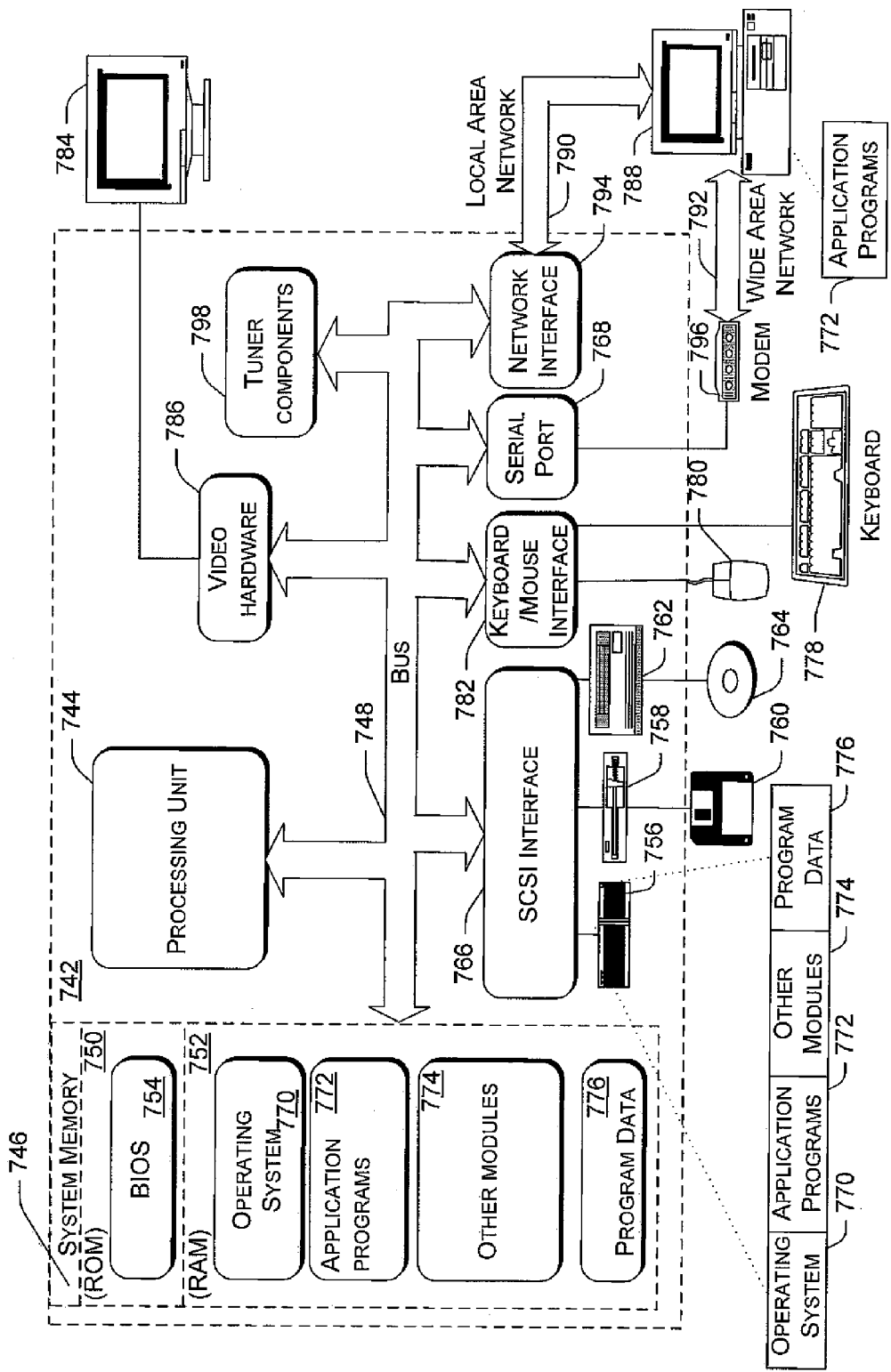
FIG. 7 illustrates exemplary systems, devices, and components in an environment in which media player performance can be evaluated in accordance with one implementation.

Although various implementations may be incorporated into many types of operating environments, a description of but one exemplary environment appears in FIG. 7 in the context of an exemplary general-purpose computing device.

Exemplary Implementations

Exemplary Systems

Figure 1:
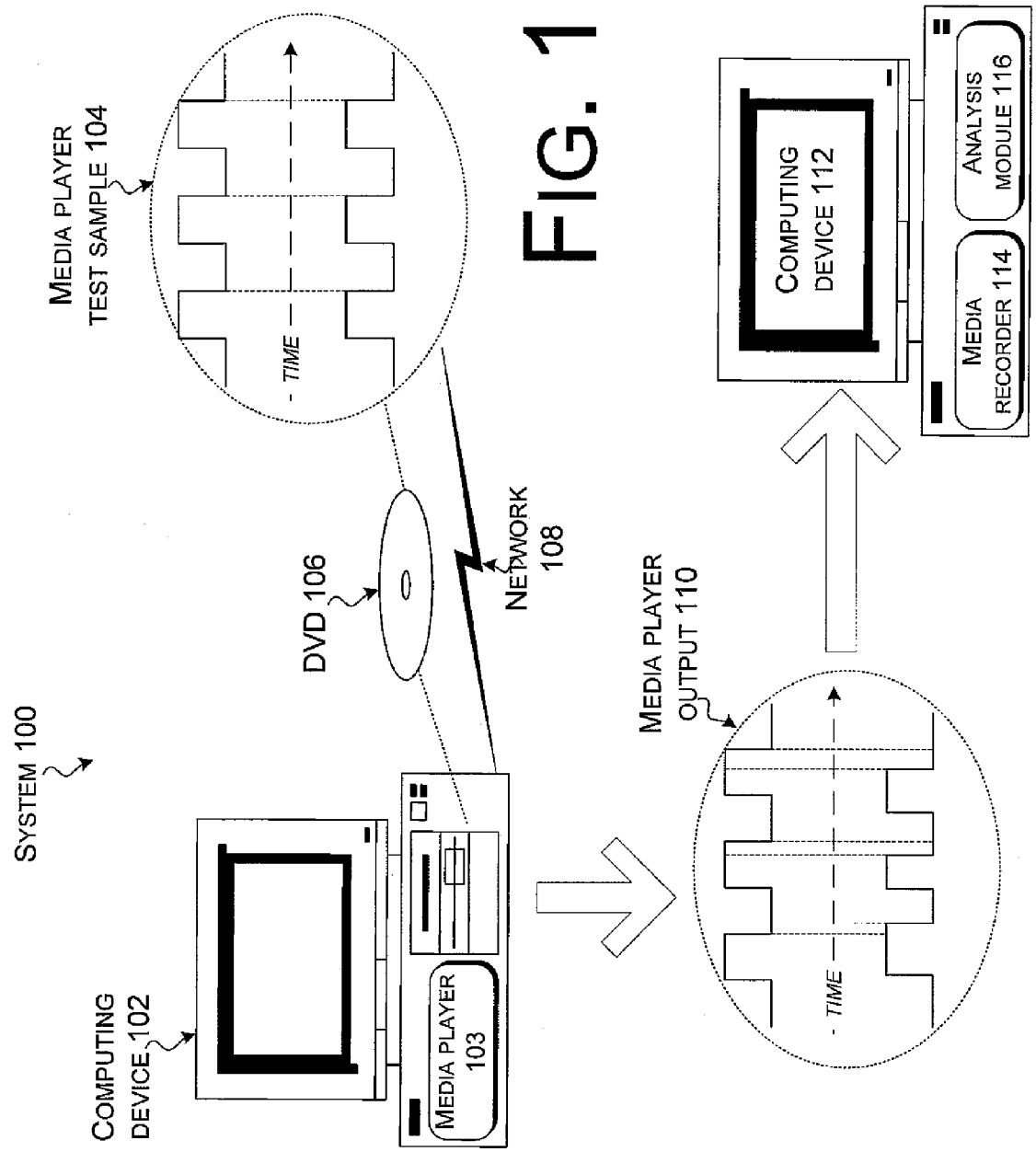
FIGS. 1-2 illustrate representations of an exemplary system in which media player evaluation can be implemented in accordance with one embodiment.

FIG. 1 illustrates an exemplary system 100 for detecting audio video asynchrony caused by a media player System 100 includes a computing device 102, such as a PC. Computing device 102 can provide a media player functionality such as via a media player module 103. The media player 103 can be considered a device under test for the following description.

An exemplary media player test sample 104 can be supplied to computing device 102 for testing purposes. For ease of illustration only a portion of test sample 104 is illustrated in the accompanying Figures. The media player test sample 104 can be supplied via a physical device such as a digital versatile disk (DVD) 106 or a network 108 among others. Computing device 102 via media player module 103 can generate corresponding media player output 110 that includes audible and visible representations of media player test sample 104. Media player output 110 can be analyzed to determine a degree of asynchrony or lip synch caused by the computing device 102 in performing the media player functionality. The media player output 110 can be analyzed in real time or stored for subsequent analysis. For instance, media player output 110 can be stored by a second computing device 112 having a media recording functionality and then analyzed subsequently. In this instance, media player output 110 can be recorded by a media recorder module 114 operating on computing device 112. Similarly, analysis of the media player output 110 can be performed by an analysis module 116 operating on computing device 112.

Figure 2:
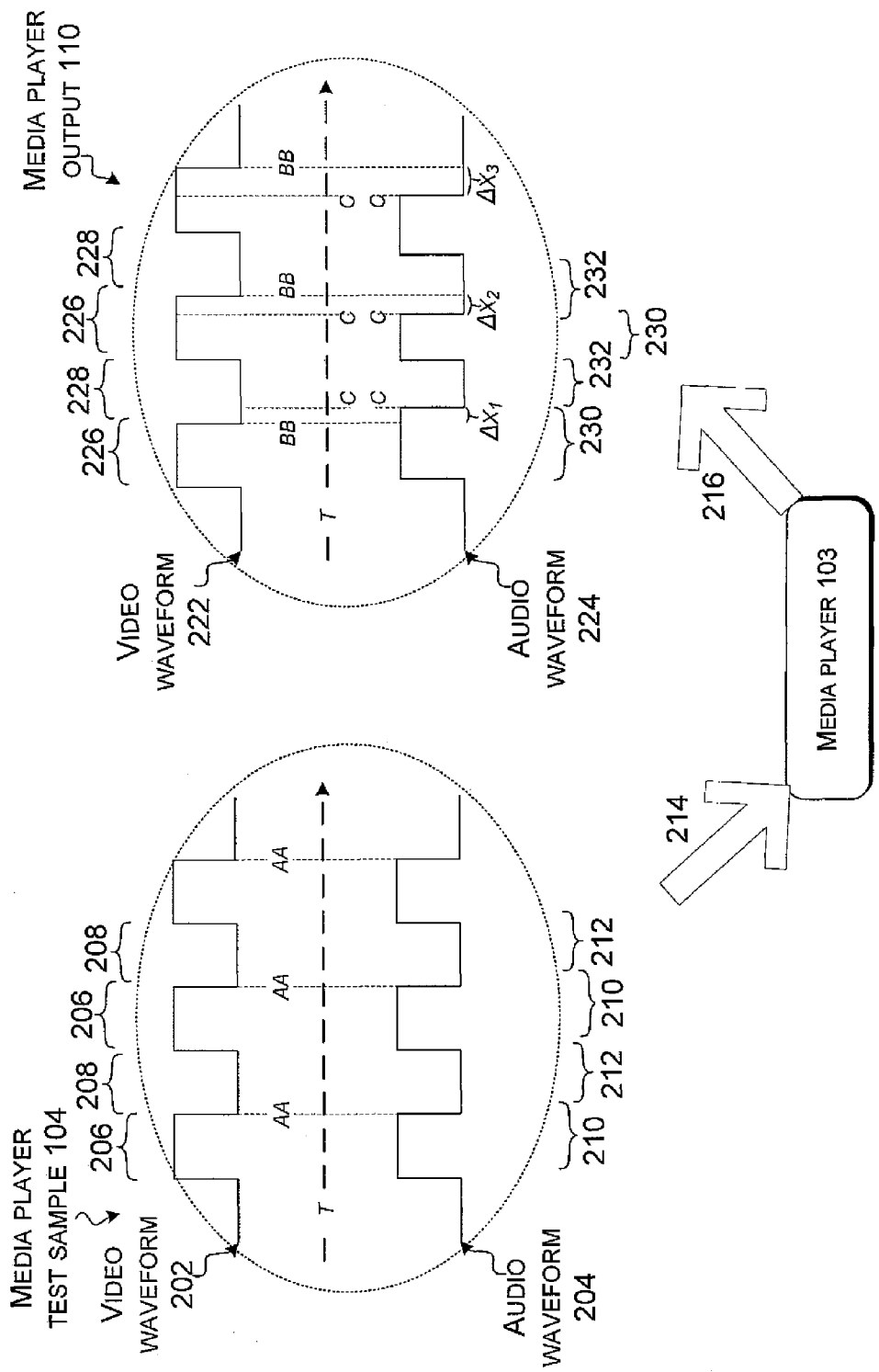

FIG. 2 illustrates the media player test sample 104 and the media player output 110 of system 100 in more detail. In this instance, media player test sample 104 comprises a video waveform 202 and an audio waveform 204. Video waveform 202 alternates between a first video state 206 and a second video state 208. Similarly, audio waveform 204 alternates between a first audio state 210 and a second audio state 212. In this instance, the video waveform and audio waveform are temporally synchronized in their transitions between respective states. For instance, temporal line aa extends orthogonally to timeline t and intersects a transition between first video state 206 and second video state 208 as well as a transition between first audio state 210 and a second audio state 212. While not illustrated here for the sake of brevity, a similar transition line also extends between the two waveforms where individual waveforms transition between the second state and the first state.

As indicated generally at 214, media player test sample 104 is supplied to media player module 103 for testing purposes. Media player module 103 processes the media player test sample 104 and as indicated generally at 216 produces media player output 110. The media player output can be utilized to generate audio and video signals which are intended to correspond to the data of the media player test sample 104. The media player output includes a video waveform 222, which corresponds to video waveform 202, and an audio waveform 224, which corresponds to audio waveform 204. Video waveform 222 includes alternating first and second video states 226, 228 which correspond to first and second video states 206, 208 of the media player test sample 104. Similarly, the audio waveform 224 includes alternating first and second audio states 230, 232 which correspond to first and second audio states 210, 212 of the media player test sample 104.

The media player output 110 can be analyzed to determine an amount of temporal error or asynchrony of the audio and video waveforms 222, 224 caused by the media player module. For instance, as mentioned above, in relation to media player test sample 104 temporal line aa illustrates that the video waveform 202 and the audio waveform 204 transition from first to second states at the same time. In contrast, consider media player output 110 where a temporal line bb extends through the transition from first video state 226 to second video state 228. Note that temporal line bb does not extend to the corresponding transition from first audio state 230 to second audio state 232. Instead, a second temporal line cc extends through the audio waveform transition between first and second states 230, 232. In each instance a temporal error introduced by the media player module is represented by the difference between temporal line bb and temporal line cc. In this example, the temporal difference is represented by values $\Delta x_1$, $\Delta x_2$, and $\Delta x_3$. The temporal differences can be utilized in a raw form and/or further processed to evaluate media player module performance as will be described in more detail below.

Exemplary Media Player Test Samples

Figure 3:
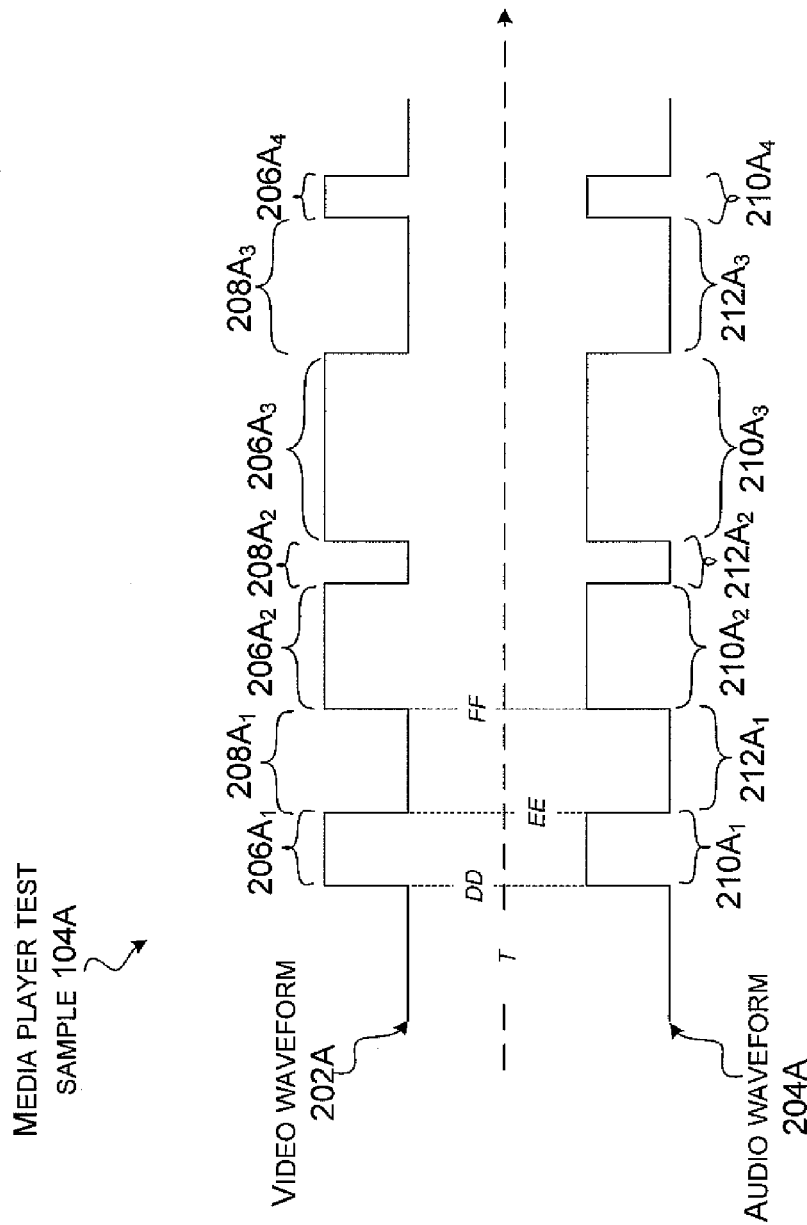
FIGS. 3-4 illustrate exemplary media player test samples which may be employed in evaluating a media player in accordance with one embodiment.

FIG. 3 illustrates an exemplary media player test sample 104A for evaluating media player module performance. Consistent with media player test sample 104 described above in relation to FIGS. 1-2, media player test sample 104A has a video waveform 202A and an audio waveform 204A. The video waveform alternates between first and second states 206A and 208A, while the audio waveform alternates between first and second states 210A, 212A. For purposes of explanation individual occurrences of each state are distinguished via a subscript delineation. The video and audio waveforms have synchronized transitions between the two states as is evidenced for example by temporal lines dd, ee, and ff (not all of the temporal lines are expressly indicated). In this instance, individual pairs of states have randomized durations. For example, note that first video state $206A_1$ and the corresponding first audio state $210A_1$ have lengths as measured along the timeline t which are different from the other pairs. Such a configuration may be more performant in evaluating media player performance than uniform durations.

Figure 4:
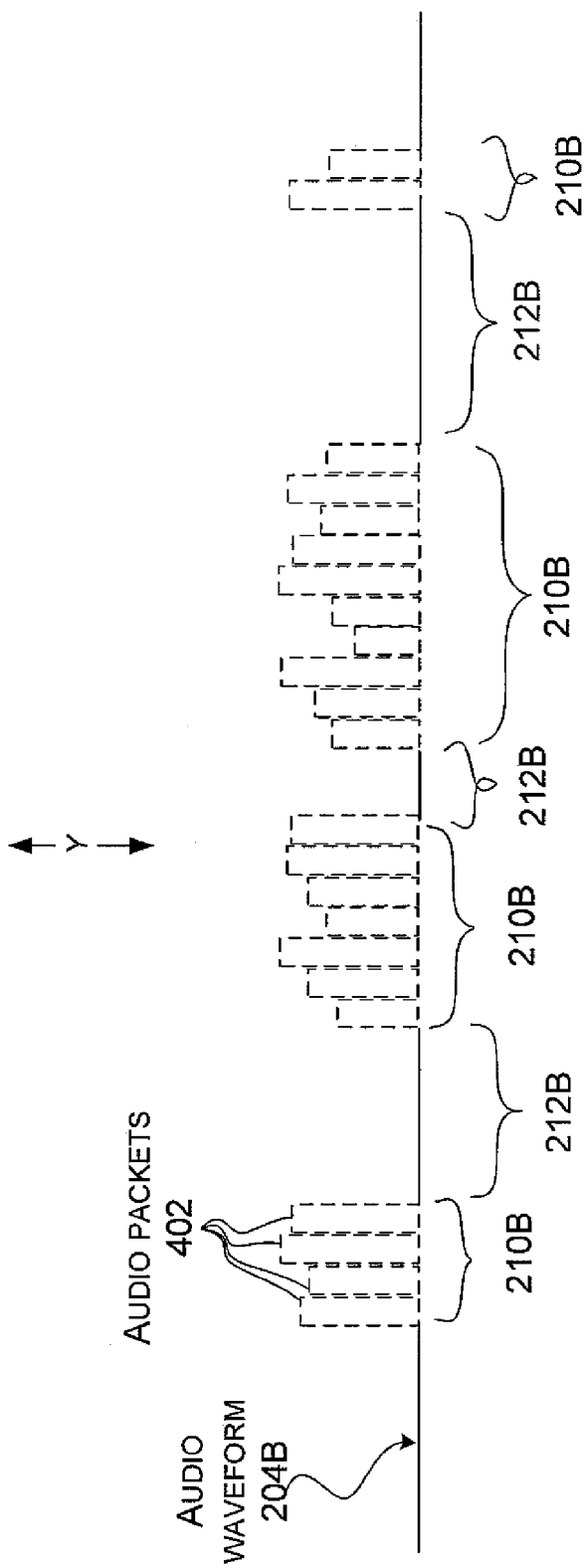

The first and second states of the audio and/or video waveforms can represent any readily distinguishable parameter. For instance, as represented in FIG. 3, the video waveform's first state represents an 'on' parameter while the second state represents an 'off' parameter. In such a scenario the on state can correspond to an instruction to display the color white on a display device, while the off state can correspond to an instruction to make the display device black, such as by leaving it blank. In another example, the first and second states can represent, for instance, 'blue' and 'red' display parameters. Similarly, in relation to the audio waveform, the first state can represent an on parameter while the second state represents an off parameter. In another example, the first audio state may represent a first frequency of audio output, while the second audio state represents a second different frequency of audio output. Any first and second states can be utilized which are distinguishable from one another, which provide a detectable beginning and end, and are consistently detectable during the duration of the state. In the example of FIG. 3 the audio and video waveforms 202A, 204A approximate square waveforms which facilitate detection of a beginning and end of individual states. For instance, with a square waveform the state starts at a definable point, maintains a generally consistent value for a period of time and then ends at a definable point. While a square waveform facilitates detection of a beginning and an end to individual states, other waveform configurations can also provide satisfactory results. FIG. 4 provides one such example.

FIG. 4 illustrates an exemplary audio waveform 204B which alternates between first and second states 210B, 212B. In this instance, the first state 210B includes one or more audio packets 402 (not all of which are designated with specificity). The audio packets have equal durations consistent with a formatting standard such as motion picture experts group (MPEG). The audio packets may or may not have equal values as expressed in the y-direction, but are readily distinguishable from a zero y value of the second state 212B. Further, the audio packets 402 serve to demarcate a beginning point and end point of the individual first states. Such a waveform can be created, for instance, by supplying a waveform having continuous audio in each of the packets and then muting regions to create the second states as desired. The skilled artisan should recognize various other techniques for generating media player test samples.

Exemplary Media Player Output Analysis

FIGS. 5-6 collectively illustrate an example of how media player output corresponding to a media player test sample can be analyzed for audio video asynchrony. FIG. 5 illustrates a portion of a hypothetical media player output 110C, while FIG. 6 provides an example of how data obtained from the media player output illustrated in FIG. 5 can be analyzed in but one implementation.

Media player output 110C illustrates media player caused temporal asynchrony between video waveform 222C and audio waveform 224C. For example temporal asynchrony is evidenced by $\Delta x_4$ between temporal lines gg and hh. Temporal line gg represents a state transition of audio waveform 224C from first state $230C_1$ to second state $232C_1$ and temporal line hh represents a state transition of video waveform 222C from first state $226C_1$ to second state $228C_1$. Similarly, temporal asynchrony is evidenced by $\Delta x_5$ between temporal lines ii and jj. Temporal line ii represent a state transition of audio waveform 224C from second state $232C_1$ to first state $230C_2$ to and temporal line jj represents a state transition of video waveform 222C from second state $228C_1$ to first state $226C_2$. The audio and video waveform transitions are synchronized at temporal line kk so that $\Delta x_6$ equals zero. Temporal asynchrony is evidenced by $\Delta x_7$ between temporal lines ll and mm. The audio and video waveform transitions are synchronized at temporal line nn so that $\Delta x_8$ equals zero and at temporal line qq where $\Delta x_{10}$ equals zero. Temporal asynchrony is evidenced by $\Delta x_9$ between temporal lines pp and oo.

FIG. 6 illustrates an example of how the temporal asynchrony values represented in FIG. 5 can be further processed for evaluating media player performance. In the example of FIG. 6, a histogram 602 is utilized to process the temporal asynchrony values obtained in FIG. 5 into a more readily comparable form. Many other types of processing can alternatively or additionally be employed as should be recognized by the skilled artisan.

Histogram 602 has bins assigned to consecutive 25 millisecond ranges starting with bin 1 and culminating with bin 12. Most human observers cannot detect temporal asynchrony or lip sync which is less than about 100 milliseconds. So one analysis technique may focus on bins 5-12 which are indicative of lip synch incidences which are more likely to be noticed by the viewer. While only a small portion of media player test samples and corresponding media player output are illustrated in FIGS. 1-5 for purposes of explanation, in many instances hundreds or thousands of audio/video transition points may be analyzed in evaluating media player performance.

Exemplary Operating System

FIG. 7 shows an exemplary computing device that can be used to implement the media player audio/video synchronization testing process described above. Computing device 742 comprises one or more processors or processing units 744, a system memory 746, and a bus 748 that couples various system components including the system memory 746 to processors 744. Multithreading techniques can be employed on the one or more processors to allow parallel processing of multiple tasks.

The bus 748 represents one or more of any of several types of bus structures, including a memory bus or memory controller, a peripheral bus, an accelerated graphics port, and a processor or local bus using any of a variety of bus architectures. The system memory 746 comprises read only memory (ROM) 750 and random access memory (RAM) 752. A basic input/output system (BIOS) 754, containing the basic routines that help to transfer information between elements within computing device 742, such as during start-up, is stored in ROM 750.

Computing device 742 can further comprise a hard disk drive 756 for reading from and writing to a hard disk (not shown), a magnetic disk drive 758 for reading from and writing to a removable magnetic disk 760, and an optical disk drive 762 for reading from or writing to a removable optical disk 764 such as a CD ROM or other optical media. The hard disk drive 756, magnetic disk drive 758, and optical disk drive 762 are connected to the bus 748 by an SCSI interface 766 or some other appropriate interface. The drives and their associated computer-readable media provide nonvolatile storage of computer-readable instructions, data structures, program modules and other data for computer 742. Although the exemplary environment described herein employs a hard disk, a removable magnetic disk 760 and a removable optical disk 764, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 756, magnetic disk 760, optical disk 764, ROM 750, or RAM 752, including an operating system 770, one or more application programs 772 (such as a media player), other program modules 774, and program data 776. A user may enter commands and information into computer 742 through input devices such as a keyboard 778 and a pointing device 780. Other input devices (not shown) may comprise a microphone, joystick, game pad, satellite dish, scanner, or the like. These and other input devices are connected to the processing unit 744 through an interface 782 that is coupled to the bus 748. A monitor 784 or other type of display device is also connected to the bus 748 via an interface, such as video hardware 786. In addition to the monitor, personal computers typically comprise other peripheral output devices (not shown) such as speakers and printers.

Computer 742 commonly operates in a networked environment using logical connections to one or more remote computers, such as a remote computer 788. The remote computer 788 may be another personal computer, a server, a router, a network PC, a peer device or other common network node, and typically comprises many or all of the elements described above relative to computer 742. The logical connections depicted in FIG. 7 comprise a local area network (LAN) 790 and a wide area network (WAN) 792. Such networking environments are commonplace in offices, enterprise-wide computer networks, intranets, and the Internet.

When used in a LAN networking environment, computer 742 is connected to the local network through a network interface or adapter 794. When used in a WAN networking environment, computer 742 typically comprises a modem 796 or other means for establishing communications over the wide area network 792, such as the Internet. The modem 796, which may be internal or external, is connected to the bus 748 via a serial port interface 768. In a networked environment, program modules depicted relative to the personal computer 742, or portions thereof, may be stored in the remote memory storage device. It will be appreciated that the network connections shown are exemplary and other means of establishing a communications link between the computers may be used.

The computer could also contain analog or digital tuner components 798. The tuner components can be linked to the system either through an internal or extended bus such as PCI or external bus such as USB bus, IEEE-1394 bus. The tuner components allow the system to receive broadcasting TV through standard TV broadcasting media such as terrestrial, cable, and satellite.

Generally, the data processors of computer 742 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Process Implementations

FIG. 8 illustrates an exemplary process 800 related to evaluating media player performance. For instance, process 800 can be utilized to detect media player introduced audio video asynchrony. The order in which the process is described is not intended to be construed as a limitation, and any number of the described process blocks can be combined in any order to implement the process. Furthermore, the process can be implemented in any suitable hardware, software, firmware, or combination thereof.

At block 802 the process supplies artificially-generated temporally-synchronized media to a media player. For instance, in one scenario described above in more detail a media player test sample is generated. The media player test sample includes a video component that has a waveform which alternates between a first video state and a second video state and an audio component includes a waveform which alternates between a first audio state and a second audio state. The audio and video waveforms are temporally synchronized in transition between respective first and second states.

At block 804 the process measures asynchrony in corresponding output from the media player. As mentioned above in relation to block 802, the media player test sample is temporally synchronized so that the audio and video components transition between respective first and second states at approximately the same time. As such, the output of the media player can be analyzed to determine asynchrony or lip sync introduced by the media player such as during the rendering process. Temporal asynchrony between associated audio and video transitions can be measured to determine synchronization error introduced by the media player. In some instances, further processing is done to present the synchronization error data in a desired format. For instance, all, or a sub-set of, the synchronization errors may be subjected to histogram analysis, averaging, and/or other analytical techniques which provide useful data fro evaluating media player performance. The data can be used to compare the performance of various media players and/or to adjust algorithms of a particular media player.

CONCLUSION

Various concepts are described above relating to evaluating media player performance. For instance, media player introduced audio/video lip sync error can be detected and quantifiably measured. Although implementations relating to media player performance have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A method, comprising:
supplying media to a media player, the media comprising:
a video component comprising a waveform which alternates between a first video state and a second video state;
an audio component comprising a waveform which alternates between a first audio state and a second audio state, wherein the audio and video components are temporally synchronized in transition between respective first and second states; and
analyzing corresponding output from the media player to determine an extent to which the audio and video components are temporally unsynchronized.

2. The method of claim 1, wherein the video component waveform approximates a first square wave and the audio component waveform approximates a second square wave.

3. The method of claim 1, wherein the first video state comprises an on state and the second video state comprises an off state.

4. The method of claim 1, wherein the first audio state comprises an on state and the second audio state comprises an off state.

5. The method of claim 1, wherein the analyzing is conducted on the corresponding output in real time.

6. A method, comprising:
supplying artificially-generated temporally-synchronized media to a media player, the supplying comprising supplying media which has a video component alternating between first and second video states and an audio component alternating between first and second audio states, the video alternating and the audio alternating being temporally synchronized; and
measuring asynchrony in corresponding output from the media player.

7. The method of claim 6, wherein the supplying further comprises streaming media content of a media player test sample over a network.

8. The method of claim 6, wherein the video component and the audio component each approximate square waveforms.

9. The method of claim 6, wherein the first state of the audio component comprises an on state and the second state of the audio component comprises an off state.

10. The method of claim 6, wherein the first state of the audio component comprises a first audio frequency and the second state of the audio component comprises a second different audio frequency.

11. The method of claim 6, wherein the first state of the video component comprises an on state and the second state of the video component comprises an off state.

12. The method of claim 11, wherein the on state represents a white video display and the off state represents a black video display.

13. The method of claim 12, wherein the black video display is indicated as a blank video display.

14. The method of claim 6, wherein the first state of the video component comprises a red video display and the second state of the video component comprises a blue video display.

15. The method of claim 6, wherein the measuring comprises measuring a temporal difference in the output between said video alternating and said audio alternating.

16. A method, comprising:
supplying media to a media player, the media having audio and video components which synchronously alternate between a first state and a second state, the first state and the second state representing square waveforms; and
detecting asynchrony, in output from the media player, between the audio and video components.

17. The method of claim 16, wherein the detecting comprises storing the media player output and subsequently analyzing the media player output.

18. The method of claim 16, wherein the detecting comprises detecting the asynchrony of the media player output in real time.

19. A computer-readable storage device having recorded thereon instructions, the instructions, upon access via a computer drive and execution by a processor, to program the computer to perform the method of claim 1.

20. A computer-readable storage device having recorded thereon instructions, the instructions, upon access via a computer drive and execution by a processor, to program the computer to perform the method of claim 6.

21. A system comprising:
a processor; and
a memory having recorded thereon instructions, the instructions, upon execution by the processor causing the method of claim 16 to be performed.

* * * * *